Sept. 10, 1935.  J. G. JACKSON  2,013,916
INTERNAL COMBUSTION ROTARY ENGINE
Filed Sept. 24, 1932  2 Sheets-Sheet 1
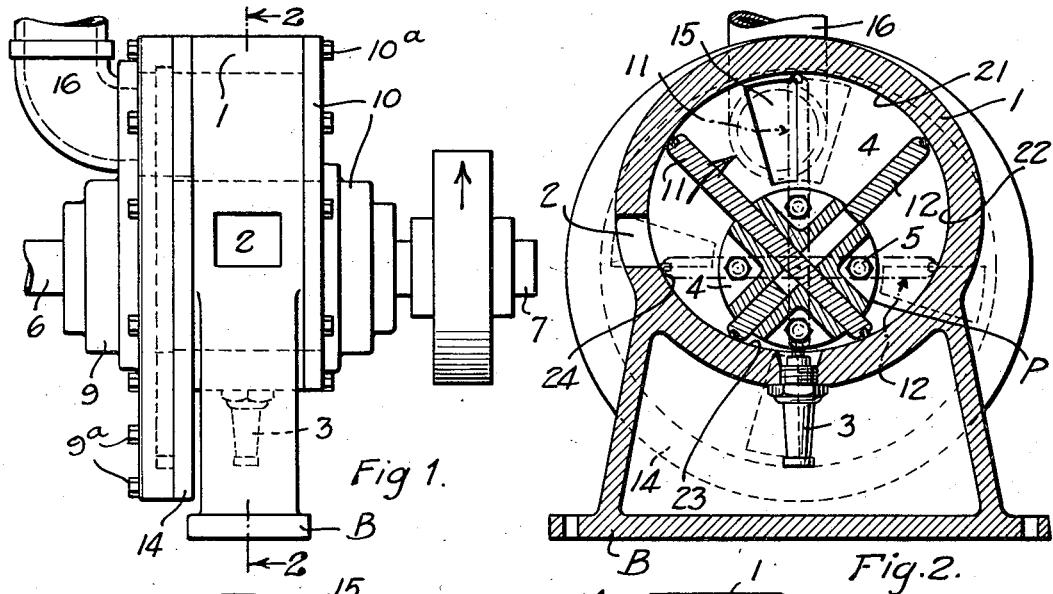
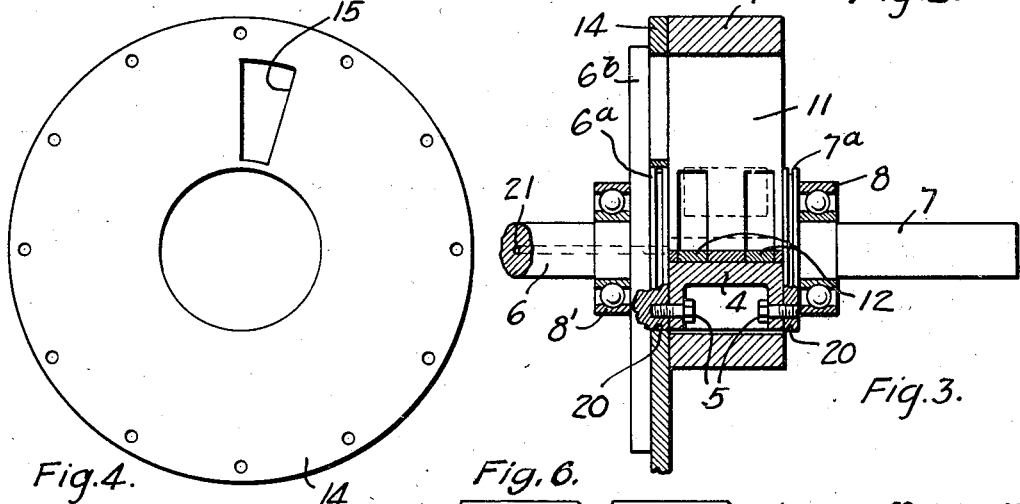
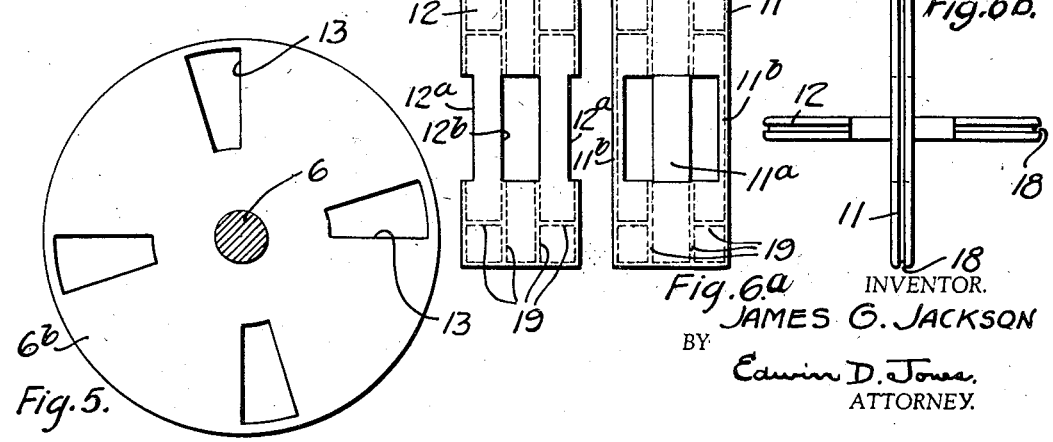
INVENTOR.
JAMES G. JACKSON
BY Edwin D. Jones.
ATTORNEY.

Sept. 10, 1935.   J. G. JACKSON   2,013,916
INTERNAL COMBUSTION ROTARY ENGINE
Filed Sept. 24, 1932   2 Sheets-Sheet 2
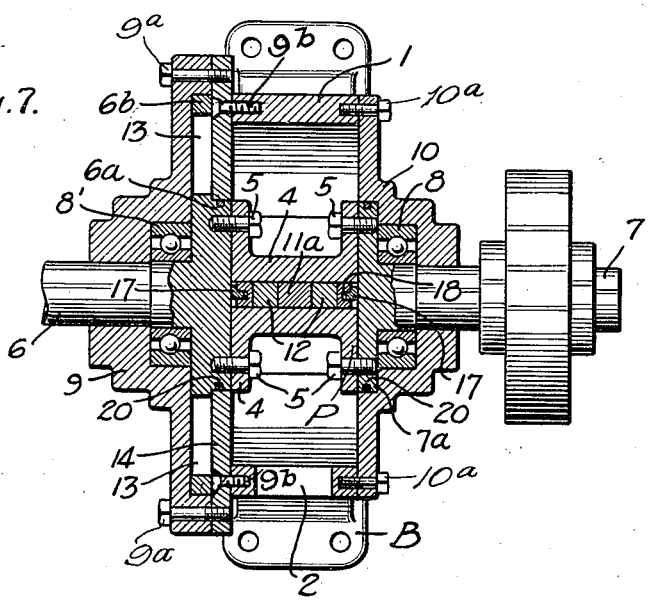
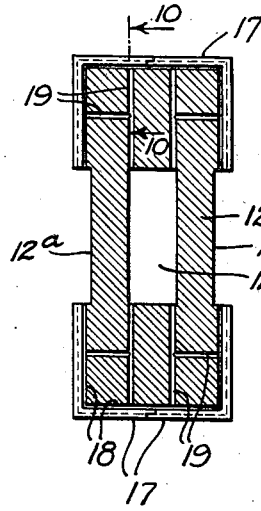
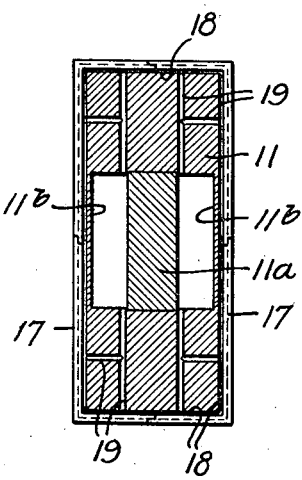
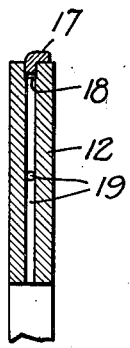
INVENTOR.
JAMES G. JACKSON
BY Edwin D. Jones.
ATTORNEY Patented Sept. 10, 1935

2,013,916

UNITED STATES PATENT OFFICE 2,013,916

INTERNAL COMBUSTION ROTARY ENGINE

James G. Jackson, Glendale, Calif., assignor of one-half to Jerome O'Connor, Los Angeles, Calif.

Application September 24, 1932, Serial No. 634,741

2 Claims. (Cl. 123—16)

My invention has reference to rotary engines and particularly, although not necessarily, to rotary internal combustion engines having elliptical cylinders and eccentrically mounted pistons such as shown in Patent No. 984,904 issued Feb. 21st, 1911.

It is a purpose of my invention to provide a rotary internal combustion engine characterized by a cylinder of true elliptical form in cross section in which a piston rotates about an axis which is eccentric of the major axis and concentric of the minor axis of the cylinder, the piston having blades movable therein and contacting with the elliptical wall of the cylinder so that under rotation of the piston the blades are radially reciprocated to successively define chambers which alternately and progressively decrease and increase from a maximum to a minimum area to coact with suitable ports and an ignition means for producing a plurality of propelling impulses with each revolution of the piston.

It is a purpose of my invention to produce an engine characterized by its structural simplicity, minimum number of moving parts, maximum power development for its weight, and the attainment of relatively high speeds with negligible vibration.

It is also a purpose of my invention to provide a rotary engine of the above described character in which the admission of fuel to each chamber of the cylinder and the exhaust of burnt gases therefrom, is effected without the employment of valves reciprocating or otherwise, and the disadvantage attendant the use of such valves.

A further purpose of my invention is the provision in a rotary engine of piston vanes radially reciprocable and structurally characterized by an intersecting arrangement one to the other, and sealing strips at the edges of the vanes maintained in sealing engagement with the cylinder walls and also effectively lubricated by supplying oil under pressure through suitable ducts in the vanes.

I will describe only one form of rotary internal combustion engine embodying my invention, and will then point out the novel features thereof in claims.

In the accompanying drawings:

Fig. 1 is a view showing in side elevation one form of rotary internal combustion engine embodying my invention.

Fig. 2 is a vertical sectional view taken on the line 2—2 of Fig. 1 and looking in the direction of the arrows.

Fig. 3 is a detail sectional view of the engine shown in the preceding view.

Fig. 4 is a detail view showing the admission port disc in side elevation.

Fig. 5 is a view similar to Fig. 4 showing the chamber port disc.

Fig. 6 is a detailed view showing in side elevation one of the piston vanes.

Fig. 6a is a view similar to Fig. 6 showing the other of the two piston vanes.

Fig. 6b is a detailed view showing the piston vanes in edge elevation and assembled.

Fig. 7 is a longitudinal sectional view of the engine taken on the line 7—7 of Fig. 1.

Fig. 8 is a sectional view of the piston vane shown in Fig. 6 taken in the central plane of the vane.

Fig. 9 is a sectional view of the piston vane shown in Fig. 6a taken in the central plane of the vane.

Fig. 10 is a transverse sectional view taken on the line 10—10 of Fig. 8.

Referring specifically to the drawings, my invention in its present embodiment comprises a cylinder 1 limaçon in cross section and fixed to and supported on a base B. Heads 9 and 10 close the ends of the cylinder, and these heads are constructed to receive the confronting ends of a pair of shaft sections 6 and 7 and roller bearings 8 and 8' in which the shaft sections rotate. Fixed to or formed integral with the confronting ends of the shaft section are flanges 6a and 7a, respectively. The edges of these flanges are grooved to receive rings 20 for sealing the joints between the flanges and cylinder heads 9 and 10 against the escape of fuel and burnt gases.

The shaft sections 6 and 7 are longitudinally alined and they constitute in effect a single shaft which is disposed eccentrically of the major axis of the cylinder and on the minor axis thereof. By reference to Fig. 2, it will be noted that this shaft lies in the plane of the minor axis of the ellipse and at the point therein at which a chord of the ellipse equal in length to the minor axis and drawn perpendicular thereto intersects said minor axis. Fixed to the shaft sections to operatively connect the latter so that they rotate in unison, I provide a piston P comprising a body of circular form made up of a plurality of sections 4 each of which is secured at its respective ends to the flanges 6a and 7a by means of bolts 5. In the present instance, the piston body is made up of four sections or quadrants 4, and these sections are so secured to the shaft flanges as to provide intervening slots. These slots coact to form two major slots which intersect each other and which slidably receive a pair of vanes 11 and 12 in such manner that the opposite ends of the vanes are in sliding contact with the inner periphery of the cylinder 1, while the side edges of the vanes are in sliding contact with the confronting faces of the flanges 6ª and 7ª.

Each vane has a length approximately equal to the length of the minor axis of the limaçon cylinder 1 and a width corresponding to the width of the interior of the cylinder. Since the shaft 6, 7 is located in the cylinder in the position above described, it follows that when either vane is in horizontal position or vertical position as illustrated in dot and dash lines in Fig. 2, it exactly fits the cylinder, the ends of the vane contacting with the curved interior surface of the cylinder. Hence, either blade will approximately fit the cylinder at every position of rotation of the piston.

The construction of the vanes 11 and 12 and the manner in which they are interrelated is best illustrated in Figs. 6, 8 and 9. The vane 11 is provided with an opening 11ᵇ of such size that by positioning the vane 12 diagonally thereof it can be extended through the opening and ultimately moved to an intersecting right angular position in respect to the vane 11, as best illustrated in Fig. 6. In order that the vane 12 may freely move relative to the blade 11, the side edges of the vane 12 are recessed as indicated at 12ª.

Once the two vanes have been assembled as described, a plate 11ª is inserted within the opening 11ᵇ of the vane 11 and then secured by spotwelding, so that the plate now forms an integral part of the vane. To accommodate this plate the vane 12 is formed with a slot 12ᵇ so that the two vanes are still free to reciprocate one on the other.

All working edges of both vanes are formed with grooves 18 in which sealing strips 17 of L-form in cross section are received in the grooves. These strips 17 are provided for the purpose of sealing the joints between the edges of the vane and the walls of the cylinder to prevent leakage of fuel and burnt gases to either side of the vanes. The strips 17 are made in sections, with the meeting ends of the sections rabbeted to allow relative movement of the sections one to the other and yet maintain a joint between any pair of sections which is closed at all times. The construction and arrangement of the several strip sections for the two vanes are clearly shown in Figs. 8 and 9.

To maintain the sealing strips 17 in sealing relation to the walls of the cylinder and other parts which they contact, and also to effectively lubricate the confronting surfaces for the purpose of reducing friction, I provide means by which oil under pressure can be supplied to the grooves 18 behind the strips 17 for forcing the strips outwardly against the walls of the cylinder. This means comprises a duct 21 in the shaft section 6. One end of the duct is adapted for communication with a source of oil supply under pressure, while the other end, as shown in Fig. 3, is in communication with the slots between the sections of the piston body so that oil under pressure is supplied not only to the slots to lubricate the vanes in their sliding movements in the piston body, but also to supply oil to the openings 11ᵇ and 12ᵇ. From these openings the oil is delivered to the grooves 18 by the provision of ducts 19 in the vanes 11 and 12. The arrangement of these ducts is clearly illustrated by the dash lines in Fig. 6.

With the piston in position within the cylinder as illustrated in Fig. 2, four separate cylinder chambers 21, 22, 23 and 24 are formed. While these chambers constantly change and merge into one another under rotative movement of the pistons, they are indicated by different numerals for convenience of description. For supplying fuel to the chamber 21, an intake manifold 16 is provided. This manifold is extended through the head 9 for communication with a master intake port 15 in a disk 14. Chamber ports 13, one for each of the cylinder chambers are provided in a disk 6ᵇ, and these ports 13 are adapted to successively register with the master port 15 for supplying charges of fuel to the individual chambers.

By reference to Fig. 7, it will be seen that the head 10 is secured to the cylinder 1 by bolts 10ª, while the head 9 is not secured directly to the cylinder but indirectly by being secured to the disk 14 through bolts 9ª. The disk 14, in turn, is secured to the cylinder 1 by countersunk cap screws 9ᵇ. The center of the disk 14 is formed with an opening to accommodate the flange 6ª. The disk 6ᵇ is formed integral with the shaft section 6 so as to be disposed to the outer side of the flange 6ª and concentric of the shaft section 6. Thus it will be seen that the disk 14 is stationary, while the disk 6ᵇ rotates with the shaft section. It will therefore be understood that under rotative movement of the disk 6ᵇ the ports 13 successively register with the master port 15.

The charges of fuel supplied successively to the several cylinder chambers, are adapted to be ignited by a spark plug 3 secured in the periphery of the cylinder 1 at a point substantially diametrically opposed to the master intake port 15. The burnt gases from the several cylinder chambers are exhausted to atmosphere through an exhaust port 2 positioned to the left and substantially midway between the spark plug 3 and the port 15.

The operation of the engine is as follows:

With the piston turning in a clock-wise direction as indicated by the arrow in Fig. 2, a charge of fuel will be drawn into the chamber 21 as the chamber increases in size with rotation of the piston. When this chamber has increased to its maximum area it is closed by the vane 11 passing the port 15. Further rotation of the piston compresses the charge and when compressed to the extent indicated in chamber 23, the charge will be ignited and the burning and expanding gases will react against the leading vane and rotate the piston to the left. As the piston continues to rotate the chamber will increase in size until it reaches the condition indicated by the chamber 24. In this position the chamber is in communication with the exhaust port 2, and thus the spent gases are discharged to atmosphere. This cycle of operation continues successively with each chamber so that four power impulses are produced with each revolution of the piston.

Although I have herein shown and described only one form of rotary internal combustion engine embodying my invention, it is to be noted that various changes and modifications may be made herein without departing from the spirit of my invention and the spirit and scope of the appended claims.

I claim:

1. A rotary engine having a cylinder; an exhaust port in the periphery of the cylinder; heads closing the ends of the cylinder; a shaft comprising two sections extended through the respective heads; flanges fixed on the confronting ends of the shaft sections; a piston body in the cylinder secured to and connecting said flanges; vanes reciprocable in the piston body and defining in conjunction with the cylinder, a plurality of non-communicating chambers; a disc secured to one of the shaft sections and having a plurality of ports therein one for each of the chambers; a second disc fixed to the cylinder between the latter and the first disc and having a master intake port therein so positioned that the ports of the first disc successively register therewith upon rotation of the shaft section to supply fuel charges successively to the several chambers; the second disc having an opening therein rotatably receiving one of the flanges; fluid-sealing means at the outer edges of the flanges; and ignition means in the cylinder.

2. A rotary engine having a cylinder; heads closing the ends of the cylinders; a shaft comprising two sections extended through the respective heads of the cylinder and having flanges on the confronting ends thereof; a piston body in the cylinder comprising a plurality of sections of L-form in cross-section and having flanged ends; means for securing the flanged ends of said sections to the flanges of said shaft sections so that intersecting slots are formed between the piston body sections; and vanes slidable in said slots.

JAMES G. JACKSON.